United States Patent
Fang et al.

(10) Patent No.: US 9,331,812 B2
(45) Date of Patent: May 3, 2016

(54) ROUND TRIP TIME AWARE DYNAMIC BANDWIDTH ALLOCATION FOR ETHERNET PASSIVE OPTICAL NETWORK OVER COAXIAL NETWORK

(71) Applicant: Futurewei Technologies, Inc., Plano, TX (US)

(72) Inventors: Liming Fang, Santa Clara, CA (US); Jim Chen, Corona, CA (US); Li Zhang, Wuhan (CN)

(73) Assignee: Futurewei Technologies, Inc., Plano, TX (US)

( * ) Notice: Subject to any disclaimer, the term of this patent is extended or adjusted under 35 U.S.C. 154(b) by 100 days.

(21) Appl. No.: 14/108,536

(22) Filed: Dec. 17, 2013

(65) Prior Publication Data

US 2014/0178076 A1    Jun. 26, 2014

Related U.S. Application Data

(60) Provisional application No. 61/745,106, filed on Dec. 21, 2012.

(51) Int. Cl.
*H04B 10/27* (2013.01)
*H04J 3/22* (2006.01)
(Continued)

(52) U.S. Cl.
CPC ............ *H04J 14/08* (2013.01); *H04J 14/0238* (2013.01); *H04Q 11/0067* (2013.01); *H04Q 11/0071* (2013.01); *H04Q 2011/0064* (2013.01); *H04Q 2011/0077* (2013.01)

(58) Field of Classification Search
CPC .. H04J 14/08; H04Q 11/0067; H04Q 11/0071
USPC .................................................. 398/98, 43
See application file for complete search history.

(56) References Cited

U.S. PATENT DOCUMENTS 6,801,547 B1    10/2004 Boyd et al.
2003/0179769 A1*  9/2003 Shi et al. .................. 370/442
(Continued)

FOREIGN PATENT DOCUMENTS

| CN | 101854563 A | 10/2010 |
|---|---|---|
| CN | 102014319 A | 4/2011 |
| CN | 102075244 A | 5/2011 |

OTHER PUBLICATIONS

"Part 3: Carrier Sense Multiple Access with Collision Detection (CSMA/CD) Access Method and Physical Layer Specifications, Amendment: Media Access Control Parameters, Physical Layers and Management Parameters for Subscriber Access Networks," IEEE Computer Society, IEEE Std 802.3ah, Sep. 7, 2004, 640 pages.

(Continued)

*Primary Examiner* — Oommen Jacob
(74) *Attorney, Agent, or Firm* — Futurewei Technologies, Inc.

(57) ABSTRACT

An apparatus comprising a receiver configured to receive a plurality of transmission requests from a plurality of end nodes via an optical network and an electrical network, a processor coupled to the receiver and configured to dynamically allocate optical transmission time slots to the end nodes according to measured RTTs of the end nodes, and a transmitter coupled to the processor and configured to transmit the allocated transmission time slots to the end nodes. Also disclosed is a method performed by an OLT comprising receiving a plurality of transmission requests from a plurality of network units via a PON and an electrical network, and allocating optical transmission time slots to the network units dynamically according to measured RTTs of the network units.

12 Claims, 11 Drawing Sheets

(51) Int. Cl.
*H04J 14/00* (2006.01)
*H04J 14/08* (2006.01)
*H04J 14/02* (2006.01)
*H04Q 11/00* (2006.01)

(56) References Cited

U.S. PATENT DOCUMENTS

| | | | | |
|---|---|---|---|---|
| 2007/0019957 A1* | 1/2007 | Kim | H04Q 11/0067 | 398/72 |
| 2007/0071031 A1* | 3/2007 | Shin | H04J 3/1694 | 370/468 |
| 2013/0004155 A1* | 1/2013 | Liang | H04Q 11/0067 | 398/9 |
| 2013/0236178 A1* | 9/2013 | Garavaglia | H04L 12/2801 | 398/67 |
| 2013/0272435 A1* | 10/2013 | Shellhammer | H04L 27/2607 | 375/257 |
| 2013/0272703 A1* | 10/2013 | Fang | H04L 12/00 | 398/58 |
| 2013/0315596 A1* | 11/2013 | Rollet | H04L 12/2424 | 398/67 |
| 2014/0178076 A1* | 6/2014 | Fang et al. | | 398/98 |

OTHER PUBLICATIONS

"Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks," IEEE Computer Society, IEEE Std 802.3av, 2009, 236 pages.

Partial English Translation and Abstract of Chinese Patent Application No. CN102014319A, Jul. 3, 2014, 4 pages.

Foreign Communication From A Counterpart Application, PCT Application No. PCT/CN2013/090042, International Search Report dated Mar. 27, 2014, 7 pages.

Foreign Communication From A Counterpart Application, PCT Application No. PCT/CN2013/090042, Written Opinion dated Mar. 27, 2014, 6 pages.

Bhaumik, P., et al., "EPON Protocol Over Coax (EPoC): Round-Trip Time Aware Dynamic Bandwidth Allocation," 17th International Conference on Optical Network Design and Modeling (ONDM), Brest, France, Apr. 16-19, 2013, pp. 287-292.

* cited by examiner

ROUND TRIP TIME AWARE DYNAMIC BANDWIDTH ALLOCATION FOR ETHERNET PASSIVE OPTICAL NETWORK OVER COAXIAL NETWORK

CROSS-REFERENCE TO RELATED APPLICATIONS

The present application claims priority to U.S. Provisional Patent Application 61/745,106, filed Dec. 21, 2012 by Jim Chen, et. al., and entitled "Method and Apparatus of Designing a Round Trip Time Aware Dynamic Bandwidth Allocation for Ethernet Passive Optical Network over Coax Network", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over the last mile. PON may be a point-to-multipoint (P2MP) network with passive splitters positioned in an optical distribution network (ODN) to enable a single feeding fiber from a central office to serve multiple customer premises. PON may employ different wavelengths for upstream and downstream transmissions. Ethernet passive optical network (EPON) is a PON standard developed by the Institute of Electrical and Electronics Engineers (IEEE) and specified in IEEE documents 802.3ah and 802.3av, both of which are incorporated herein by reference.

SUMMARY

In one embodiment, the disclosure includes an apparatus comprising a receiver configured to receive a plurality of transmission requests from a plurality of end nodes via an optical network and an electrical network, a processor coupled to the receiver and configured to dynamically allocate optical transmission time slots to the end nodes according to measured round trip times (RTTs) of the end nodes, and a transmitter coupled to the processor and configured to transmit the allocated transmission time slots to the end nodes.

In another embodiment, the disclosure includes a method performed by an optical line terminal (OLT) comprising receiving a plurality of transmission requests from a plurality of network units via a PON and an electrical network, and allocating optical transmission time slots to the network units dynamically according to measured RTTs of the network units.

In yet another embodiment, the disclosure includes a network element (NE) comprising an electrical interface configured to couple to a plurality of end nodes via an electrical network and comprising a receiver configured to receive transmission requests in the electrical network from the end nodes, an optical interface configured to couple to a central access node via an optical network and comprising a receiver configured to receive optical transmission grants from the central access node, and a processor coupled to the optical interface and the electrical interface and configured to schedule transmissions dynamically in the electrical network according to the optical transmission grants and measured RTTs of the end node.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
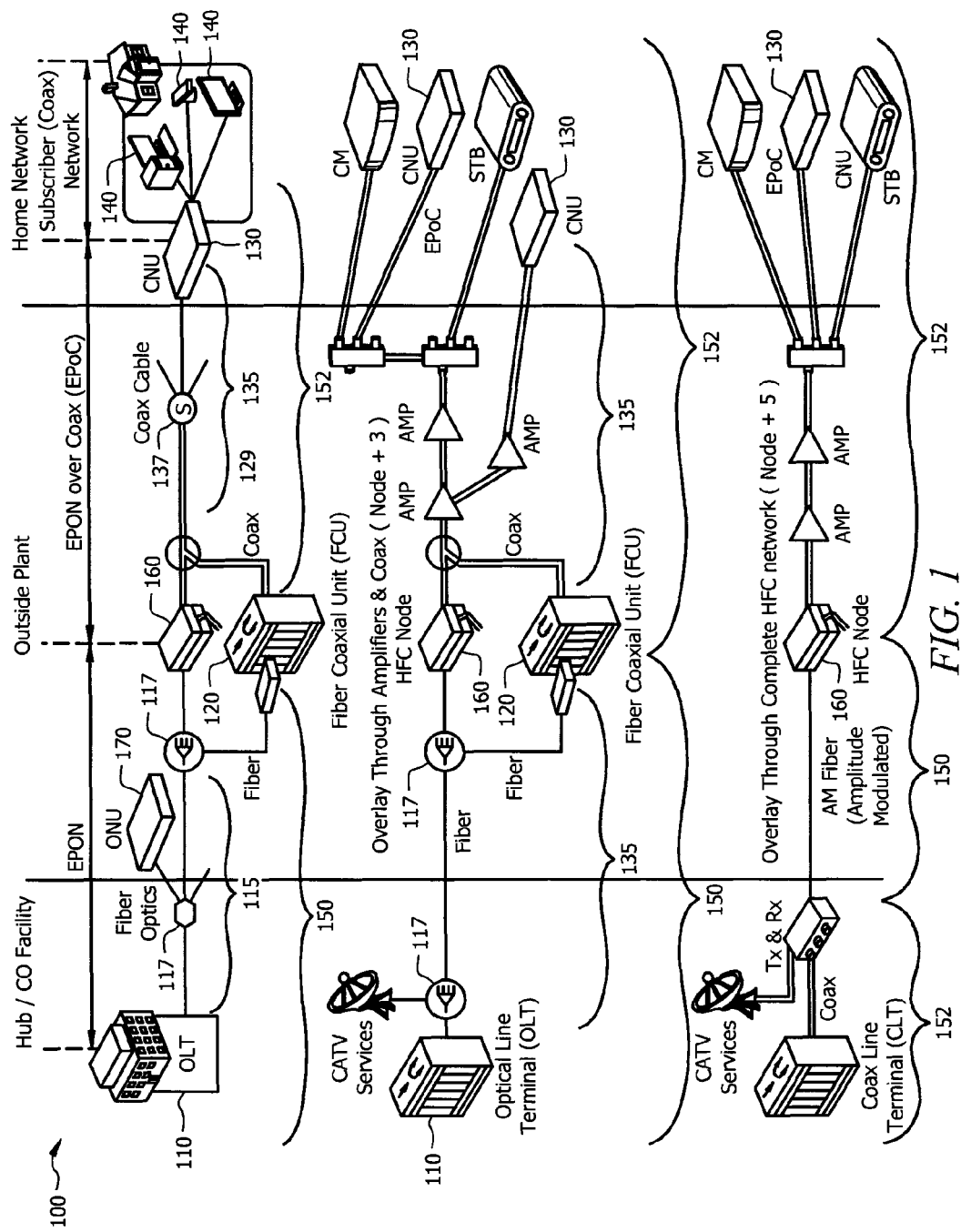
FIG. 1 is a schematic diagram of an embodiment of a unified optical-coaxial network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A PON may be a P2MP network comprising an OLT at a central office, an ODN, and a plurality of ONUs at customer premises. The OLT may implement an EPON Media Access Control (MAC) layer for transmission of Ethernet frames. Multi-Point Control Protocol (MPCP) may be employed to perform bandwidth assignment, bandwidth polling, auto-discovery, and ranging. Ethernet frames may be broadcast downstream based on a Logical Link Identifier (LLID) embedded in a preamble frame. Upstream bandwidth may be assigned based on an exchange of Gate and Report messages between an OLT and an ONU.

Ethernet over Coaxial (EoC) may describe any technology which can be used for transmission of Ethernet frames over a coaxial network. Other than Data Over Cable Service Interface Specification (DOCSIS), all EoC technologies may transmit Ethernet Frames in the MAC layer. EoC technologies may include, for example, Multimedia over Coax Alliance (MoCA), Home Grid (G.hn), Home Phoneline Networking Alliance (HPNA), and Home Plug Audio/Visual (A/V). EoC has been adapted to support outdoor coax access from an ONU to an EoC head end connected to Customer Premises Equipment (CPE) located in subscribers' homes.

An Ethernet PON over Coaxial (EPoC) system may be a hybrid access network employing both optical and coaxial technologies. The EPoC may comprise an optical segment that may comprise a PON, and a coaxial segment that may comprise a coaxial cable network. In the PON segment, an OLT may be positioned in a local exchange or central office where the OLT may connect the EPoC access network to an Internet Protocol (IP), Synchronous Optical Network (SONET), and/or Asynchronous Transfer Mode (ATM) backbone. In the coaxial segment, CNUs may be positioned at end-user locations, and each CNU may serve a plurality (e.g. three to four) of end users which may be known as subscribers. A Fiber Coaxial Unit (FCU) may merge the interface between the PON segment and the coaxial segment of the network. The FCU may be a single box unit that may be located where an ONU and a Coaxial Line Terminal (CLT) are fused together, for example, at a curb or at a basement of an apartment building.

In an embodiment of an EPON architecture, the MPCP defined in the IEEE 802.3ah and IEEE 802.3av may provide signaling mechanisms between an OLT and ONUs through MPCP message exchange. Operational functions of MPCP may include coordinating upstream transmissions from ONUs to the OLT. MPCP may employ Gate and Report messages to facilitate arbitration of upstream transmissions. Each ONU may buffer data packets that are ready to be sent to the OLT in a set of transmission queues. The ONUs may send Report messages to the OLT to report bandwidth requirements in the form of transmission queue statuses. Each transmission queue status may indicate the number of bytes being held in a transmission queue and may serve as a bandwidth request. The OLT may reply with Gate messages to grant upstream bandwidths to the ONUs. Each upstream grant may specify an upstream transmission time slot with a start time and a duration in which the ONU may be allowed to send upstream traffic. Each Report message may comprise one or more transmission queue statuses and each Gate message may comprise one or more upstream grants. The ONUs may send piggyback Report messages with data in the assigned time slots to update the OLT with the most current transmission queue statuses. The Report messages may be sent before or after the data in the assigned time slots. The OLT may also provision for some minimum bandwidth for standalone Report messages to allow ONUs without a previous grant (e.g. with empty queue previously) to request for bandwidths.

There may be a rising demand which supports the use of EPON as an access system to interconnect with multiple coaxial cables to connect CPEs located in the subscribers' homes with an EPoC architecture. The design of an upstream bandwidth allocation scheme that may adapt to traffic demand from EPON ONUs and EPoC CNUs as well as provision for Quality of Service (QoS) may improve network performances in an EPON and/or EPoC network.

Disclosed herein is a DBA scheme that may be performed by an OLT across a hybrid access network. For example, the hybrid access network may comprise an optical segment with EPON ONUs and an electrical coaxial segment with EPoC CNUs. The DBA scheme may be RTT-aware and may consider RTTs between an OLT and EPON ONUs and/or EPoC CNUs for efficient upstream bandwidth allocations. The DBA scheme may include inter-ONU/CNU scheduling and intra-ONU/CNU scheduling. In one embodiment, an OLT may assign upstream bandwidths to EPON ONUs and/or EPoC CNUs in an increasing order of ONUs' and/or CNUs' RTTs to reduce idle bandwidth due to RTT. In another embodiment, an OLT may assign contiguous transmission time slots to CNUs within a coaxial plant (e.g. CNUs connecting to the same FCU) and/or to transmission requests from the same ONU or CNU, which may reduce the number of guard intervals that may otherwise be required between allocations from different ONUs, FCUs, and/or CNUs. The DBA scheme may extend EPON service level agreement (SLA) (e.g. QoS and/or Class of Service (CoS)) to support EPoC end-to-end SLA. The DBA scheme may employ a centralized architecture or a distributed architecture. In a centralized architecture, an OLT may arbitrate all upstream transmissions, whereas in a distributed architecture, an OLT may allocate upstream optical transmission time slots in the fiber domain and an FCU may allocate coaxial upstream resources in the coax domain.

FIG. 1 illustrates an embodiment of a unified optical-coaxial network 100 comprising an optical portion 150 and a coaxial (electrical) portion 152. The unified optical-coaxial network 100 may include an OLT 110, at least one CNU 130 coupled to a plurality of subscriber devices 140, and an FCU 120 positioned between the OLT 110 and the CNU 130, e.g., between the optical portion 150 and the coaxial portion 152. The OLT 110 may be coupled via an ODN 115 to the FCUs 120, and optionally to one or more ONUs 170, or one or more Hybrid Fiber Coaxial (HFC) nodes 160 in the optical portion 150. The ODN 115 may comprise fiber optics and an optical splitter 117 and/or a cascade of 1×M passive optical splitters that couple OLT 110 to the FCU 120 and any ONUs 170. The value of Min EPoC, e.g., the number of FCUs, may for example be 4, 8, 16, or other values and may be selected by the operator depending on factors such as optical power budget. The FCU 120 may be coupled to the CNUs 130 via an electrical distribution network (EDN) 135, which may comprise a cable splitter 137, a cascade of taps/splitters, and/or one or more amplifiers. Each OLT 110 port may serve 32, 64, 128 or 256 CNUs 130. It should be noted that the upstream transmissions from CNUs may reach the FCU 120 and not the other CNUs 130 due to a directional property of the tap. The distances between the OLT 110 and the ONUs 170 and/or FCUs 120 may range from about 10 to about 20 kilometers (km), and the distances between the FCU 120 and CNUs 130 may range from about 100 to about 500 meters (m). The unified optical-coaxial network 100 may comprise any number of HFCs 160, FCUs 120 and corresponding CNUs 130. The components of unified optical-coaxial network 100 may be arranged as shown in FIG. 1 or any other suitable arrangement.

The optical portion 150 of the unified optical-coaxial network 100 may be similar to a PON in that the optical portion 150 may be a communications network that does not require active components to distribute data between the OLT 110 and the FCU 120. Instead, the optical portion 150 may use the passive optical components in the ODN 115 to distribute data between the OLT 110 and the FCU 120. Examples of suitable protocols that may be implemented in the optical portion 150 may include asynchronous transfer mode PON (APON) or broadband PON (BPON) defined by the International Telecommunication Union (ITU) Telecommunication Standardization Sector (ITU-T) document G.983, Gigabit PON (GPON) defined by the ITU-T document G.984, the EPON defined by the IEEE documents 802.3ah and 802.3av, all of which are incorporated by reference as if reproduced in their entirety, the wavelength division multiplexing (WDM) PON (WDM-PON), and the Next Generation EPON (NGEPON) in development by IEEE.

The OLT 110 may be any device configured to communicate with the CNUs 130 via the FCU 120. The OLT 110 may act as an intermediary between the FCUs 120 and/or CNUs 130 and another backbone network (e.g. the Internet). The OLT 110 may forward data received from a backbone network to the FCUs 120 and/or CNUs 130 and forward data received from the FCUs 120 or CNUs 130 onto the backbone network. Although the specific configuration of the OLT 110 may vary depending on the type of optical protocol implemented in the optical portion 150, in an embodiment, OLT 110 may comprise an optical transmitter and an optical receiver. When the backbone network employs a network protocol that is different from the protocol used in the optical portion 150, OLT 110 may comprise a converter that may convert the backbone network protocol into the protocol of the optical portion 150. The OLT converter may also convert the optical portion 150 protocol into the backbone network protocol.

The ODN 115 may be a data distribution system that may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the FCU 120. It should be noted that the optical fiber cables may be replaced by any optical transmission media in some embodiments. In some embodiments, the ODN 115 may comprise one or more optical amplifiers. The ODN 115 may extend from the OLT 110 to the FCU 120 and any optional ONUs 170 in a branching configuration as shown in FIG. 1, but may be alternatively configured as determined by a person of ordinary skill in the art.

The FCU 120 may be any device or component configured to forward downstream data from the OLT 110 to the corresponding CNUs 130 and forward upstream data from the CNUs 130 to the OLT 110. The FCU 120 may convert the downstream and upstream data appropriately to transfer the data between the optical portion 150 and the coaxial portion 152. The data transferred over the ODN 115 may be transmitted and/or received in the form of optical signals, and the data transferred over the EDN 135 may be transmitted and/or received in the form of electrical signals that may have the same or different logical structure as compared with the optical signals. As such, the FCU 120 may encapsulate or frame the data in the optical portion 150 and the coaxial portion 152 differently. In an embodiment, the FCU 120 may include a MAC layer and physical (PHY) layers, corresponding to the type of signals carried over the respective media. The MAC layer may provide addressing and channel access control services to the PHY layers. As such, the PHY may comprise an optical PHY and a coaxial PHY. In many embodiments, the FCU 120 may be transparent to the CNU 130 and OLT 110 in that the frames sent from the OLT 110 to the CNU 130 may be directly addressed to the CNU 130 (e.g. in the destination address), and vice-versa. As such, the FCU 120 may intermediate between network portions, namely an optical portion 150 and a coaxial portion 152 in the example of FIG. 1.

The ONUs 170 may be any devices that are configured to communicate with the OLT 110 and may terminate the optical portion 150 of the network. The ONUs 170 may present customer service interfaces to end users. In some embodiments, an ONU 170 may merge with a CLT to form an FCU 120.

The electrical portion 152 of the unified electrical and coaxial network 100 may be similar to any known electrical communication system. The electrical portion 152 may not require any active components to distribute data between the FCU 120 and the CNU 130. Instead, the electrical portion 152 may use the passive electrical components in the electrical portion 152 to distribute data between the FCU 120 and the CNUs 130. Alternatively, the electrical portion 152 may use some active components, such as amplifiers. Examples of suitable protocols that may be implemented in the electrical portion 152 include MoCA, G.hn, HPNA, and Home Plug A/V.

The EDN 135 may be a data distribution system that may comprise electrical cables (e.g. coaxial cables, twisted wires, etc.), couplers, splitters, distributors, and/or other equipment. In an embodiment, the electrical cables, couplers, splitters, distributors, and/or other equipment may be passive electrical components. Specifically, the electrical cables, couplers, splitters, distributors, and/or other equipment may be components that do not require any power to distribute data signals between the FCU 120 and the CNU 130. It should be noted that the electrical cables may be replaced by any electrical transmission media in some embodiments. In some embodiments, the EDN 135 may comprise one or more electrical amplifiers. The EDN 135 may extend from the FCU 120 to the CNU 130 in a branching configuration as shown in FIG. 1, but may be alternatively configured as determined by a person of ordinary skill in the art.

In an embodiment, the CNUs 130 may be any devices that are configured to communicate with the OLT 110, the FCU 120, and any subscriber devices 140. The CNUs 130 may act as intermediaries between the FCU 120 and the subscriber devices 140. For instance, the CNUs 130 may forward data received from the FCU 120 to the subscriber devices 140, and may forward data received from the subscriber devices 140 toward the OLT 110. Although the specific configuration of the CNUs 130 may vary depending on the type of unified optical-coaxial network 100, in an embodiment, the CNUs 130 may comprise an electrical transmitter configured to send electrical signals to the FCU 120 and an electrical receiver configured to receive electrical signals from the FCU 120. Additionally, the CNUs 130 may comprise a converter that may convert FCU 120 electrical signals into electrical signals for the subscriber devices 140, such as signals in IEEE 802.11 wireless local area network (WiFi) protocol. The CNUs 130 may further comprise a second transmitter and/or receiver that may send and/or receive the converted electrical signals to the subscriber devices 140. In some embodiments, CNUs 130 and coaxial network terminals (CNTs) are similar, and thus the terms are used interchangeably herein. The CNUs 130 may be typically located at distributed locations, such as the customer premises, but may be located at other locations as well.

The subscriber devices 140 may be any devices configured to interface with a user or a user device. For example, the subscribed devices 140 may include desktop computers, laptop computers, tablets, mobile telephones, residential gateways, televisions, set-top boxes, and similar devices.

In an embodiment, each ONU 170 or CNU 130 may buffer data packets ready to be sent to the OLT 110 in a set of internal transmission queues and may send a Report message to the OLT 110 to request for an allocation of a time slot to transmit the data. The OLT 110 may perform upstream scheduling based on the request and may grant upstream bandwidths by sending a MPCP Gate message with an upstream optical time window or time slot (e.g. starting time and duration) that may be used by the requesting ONU 170 or CNU 130 to transmit the queued data. In addition to scheduling and generating upstream grants, the OLT 110 may convert the optical allocations into coaxial allocations. For example, bandwidth allocations in the optical fiber domain (e.g. bit-stream transmissions) may be in the form of one-dimensional time slots, while bandwidth allocations in the coaxial domain may be in the form of two-dimensional time-frequency slots (e.g. Orthogonal Frequency Division Multiplexed (OFDM) symbol-based transmissions). In an OFDM system, upstream resources may be described using an Uplink Media Allocation Plan (UL-MAP). An UL-MAP may specify allocations in terms of physical resource blocks (PRBs). A PRB may comprise a group of subcarriers in frequency and may span one symbol in time. Each PRB may be associated with a modulation profile, which may specify the number of bits that may be carried in each subcarrier within the PRB (e.g. stored in a PRB bit-loading table). The UL-MAP may be embedded in a Gate message in several ways depending on the design of the protocol. For example, the UL-MAP may be embedded in the preamble of an Ethernet frame carrying the Gate message or in the Gate message body.

The OLT 110 may allocate upstream bandwidths statically or dynamically, with or without support for differential QoS. In a static bandwidth allocation scheme, OLT 110 may assign pre-defined constant time slots for each user (e.g. ONUs 170 or CNUs 130) regardless of the variable bandwidth requests or requirements of each user. In a DBA scheme, OLT 110 may allocate time slots of appropriate size based on variable bandwidth requests of each user and distribute bandwidth utilization fairly among the users. As such, DBA may provide better channel utilization when the network traffic may be predominantly of burst nature. In addition, DBA may support QoS by prioritizing packets based on time-sensitiveness (e.g. real time constraints) and allocate bandwidths for time-sensitive traffic first.

Figure 2:
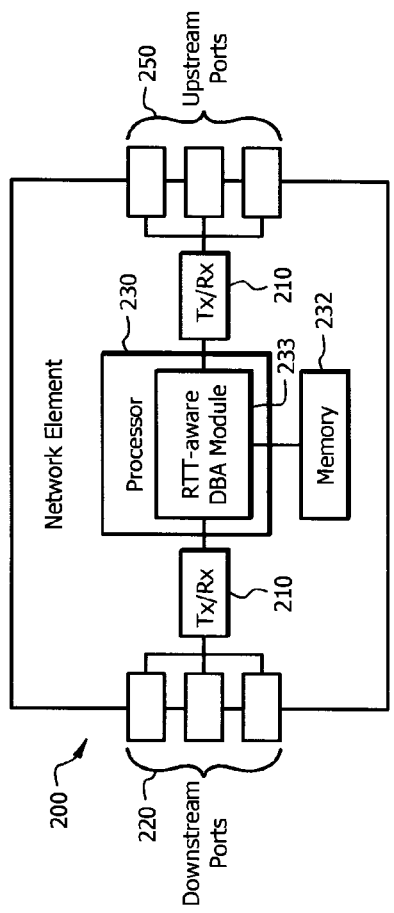
FIG. 2 is a schematic diagram of an embodiment of an NE, which may act as a node in a unified optical-coaxial network.

FIG. 2 is a schematic diagram of an embodiment of an NE 200, which may act as an OLT 110 by implementing any of the schemes described herein. In some embodiments NE 200 may also act as other node(s) in the network, such as a head end system that may be coupled to an optical access network, a media converter unit that may be coupled to an optical access network and an electrical wireless (e.g. WiFi) or wired network (e.g. coaxial, any Digital Subscriber Line (xDSL), powerline, etc). One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 200. For instance, the features/methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise an RTT-aware DBA module 233, which may implement an RTT-aware DBA method at an OLT, or any other scheduling nodes. In an alternative embodiment, the DBA module 233 may be implemented as instructions stored in the memory devices 232, which may be executed by processor 230. The memory device 232 may comprise a cache for temporarily storing content, e.g., a Random Access Memory (RAM). Additionally, the memory module 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230 and/or memory 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

In an embodiment of an EPON, an OLT (e.g. OLT 110) may perform DBA by polling transmission queue statuses from ONUs (e.g. ONUs 170) and allocating upstream bandwidths according to the requested bandwidths. Some examples of polling schemes may be poll-and-stop, interleaved polling, and interleaved-polling with stop. In a poll-and-stop scheme, an OLT may send a Gate message to an ONU and wait until data and Report message from the ONU is received before granting bandwidth to another ONU. The idle time from the stop and wait in the poll-and-stop scheme may lead to low utilization of upstream channel. Alternatively, an OLT may employ an interleaved polling scheme to reduce idle time, such as the interleave polling with adaptive cycle time (IPACT) scheme. In the IPACT scheme, an OLT may send a Gate message to a succeeding ONU while receiving transmission from a previously granted ONU. In the IPACT scheme, the OLT may not consider transmission queue statuses from all ONUs at the time of scheduling, which may reduce the suitability of the IPACT scheme for QoS provisioning. In order to provision for QoS, an interleaved polling with stop scheme may be used, where an OLT may collect all ONUs' Report messages in a scheduling cycle and then assign allocations in a subsequent scheduling cycle by considering all the received ONUs' Report messages and according to priorities.

Figure 3:
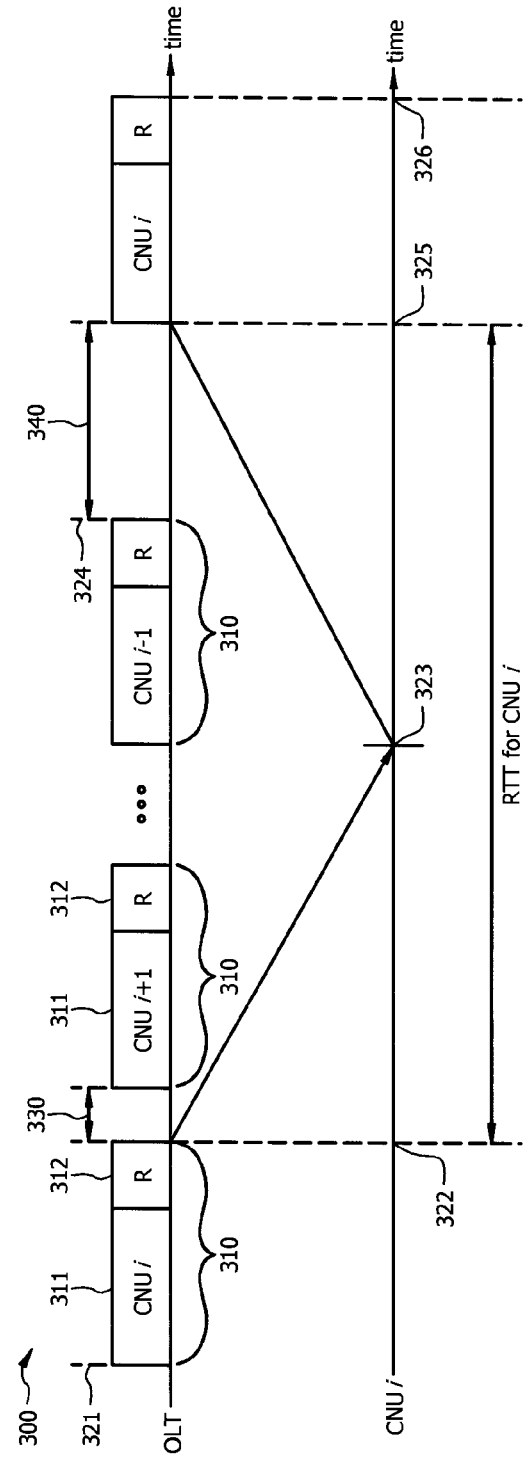
FIG. 3 is a timing diagram of an embodiment of a round trip time-effect (RTT-effect) in an interleaved polling scheduling scheme.

FIG. 3 is a timing diagram 300 of an embodiment of an RTT-effect in an interleaved polling scheduler, such as the IPACT scheduler. In timing diagram 300, an OLT (e.g. OLT 110) may receive data 311 and Report messages 312 from a plurality of CNUs (e.g. CNU 130) in allocated transmission time slots 310 separated by guard intervals 330. The guard intervals may be inserted between transmission time slots from different ONUs (e.g. ONUs 170), FCUs (e.g. FCUs 120), and/or CNUs to protect the transmission windows from interferences that may otherwise occur between the different network units. In an interleaved polling scheduler, the RTT-effect may occur when the propagation delay is high. RTT may refer to a round trip (e.g. propagation) delay between an OLT and an ONU or a CNU, which may be the time between an OLT sending a Gate message to the ONU or CNU and the time when the OLT receives a response from the ONU or CNU, respectively. The present disclosure may employ the term "ONU's RTT" to refer to the RTT between an OLT and an ONU and the term "CNU's RTT" to refer to the RTT between an OLT and a CNU. RTT may include all end-to-end system delays, such as propagation delays, processing delays, buffering delays, and any other system delays that may occur at intermediate nodes. In timing diagram 300, the OLT may receive a data 311 and a Report message 312 from a CNU i at time 321. In response to the Report message, the OLT may grant CNU i a transmission time slot by sending a Gate message at time 322. CNU i may receive the Gate message at time 323 and may respond by sending a reply (e.g. queued data and updated Report message) to the OLT. When the RTT between the OLT and CNU i is high, the reply may reach the OLT at a time (e.g. time 325) later than the end of a current schedule (e.g. time 324), thus causing idling time period 340, which may be termed the RTT-effect. In the case of an interleaved polling with stop scheme, the reply may reach the OLT later than the end of a current scheduling cycle, which may cause the OLT to ignore or discard the reply from CNU i. One solution may be for the OLT to extend the current scheduling cycle to accommodate the CNU with the longest RTT (e.g. extending the scheduling cycle to time 326). However, this solution may reduce bandwidth utilization due to the inclusion of the idling time period 340. Although timing diagram 300 may describe the RTT-effect in the context of EPoC CNUs, the RTT-effect may similarly occur with EPON ONUs. The RTT effect may be more pronounced in an EPoC network since CNUs' RTTs may be in the order of microseconds (us) to milliseconds (ms), while ONUs' RTTs may be in the order of nanoseconds (ns) (e.g. time Quanta (TQ)). As such, an RTT-aware DBA scheme that considers both ONU's RTTs and CNUs' RTTs may improve upstream bandwidth utilization.

Figure 4:
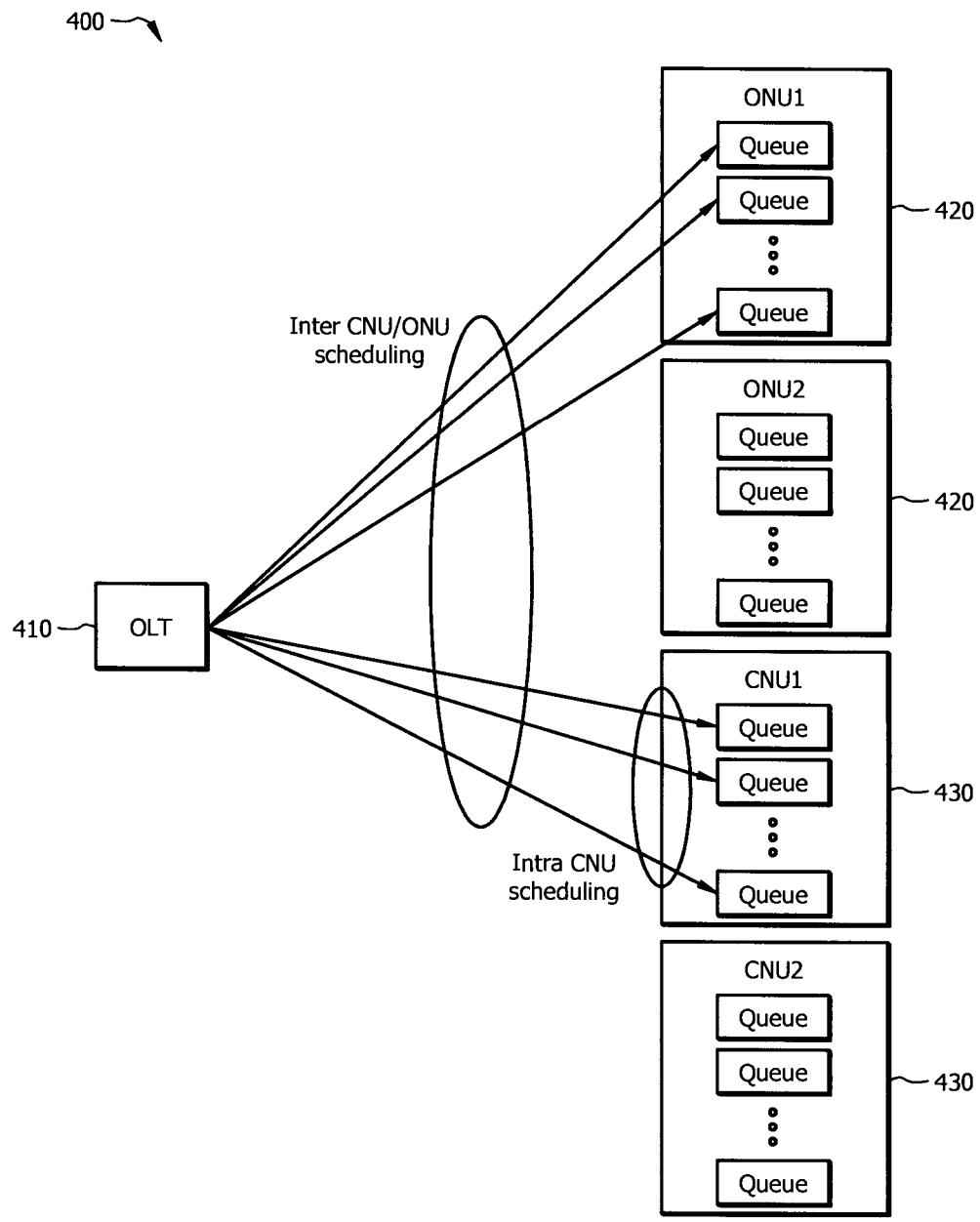
FIG. 4 is a schematic diagram of another embodiment of a unified optical-coaxial network employing a centralized scheduling scheme.

FIG. 4 is a schematic diagram of another embodiment of a unified optical-coaxial network 400, which may be similar to network 100, and may employ a centralized scheduling scheme. The network 400 may comprise an OLT 410, a plurality of ONUs 420, and a plurality of CNUs 430, which may be substantially similar to OLT 110, ONUs 170, and CNUs 130, respectively. In network 400, the OLT 410 may employ a centralized scheduling scheme to arbitrate all upstream transmissions by dynamically allocating transmission grants to the ONUs 420 and/or CNUs 430 based on Report messages received from the ONUs 420 and/or CNUs 430. The centralized scheduling scheme may include inter-ONU/CNU scheduling and intra-ONU/CNU scheduling. Inter-ONU/CNU scheduling may refer to the scheduling of upstream transmission time slots between ONUs 420 and/or CNUs 430. Intra-ONU/CNU scheduling may refer to the scheduling of upstream transmission time slots between transmission queues within an ONU 420 or a CNU 430. For example, OLT 410 may consider RTTs of all ONUs 420 and CNUs 430 in network 400 during inter-ONU/CNU scheduling and may consider delivery priorities of all transmission queues within an ONU 420 or a CNU 430 during intra-ONU/CNU scheduling.

As discussed above, each ONU or CNU may buffer data packets that are ready for transmissions in transmission queues. The transmission queues may be sorted by LLIDs, CoS, priorities, or other identifiers. An OLT may assign one or more LLIDs to an ONU or CNU to identify point-to-point (P2P) logical links between an OLT and the ONU or CNU. An OLT may also classify data with CoS based on data types (e.g. data, voice, or video) and each CoS may be assigned with a delivery priority based on service level and/or priority (e.g. QoS). Some examples of CoS may include expedited forwarding (EF), assured forwarding (AF), and best effort (BE). EF service may be dedicated to low-loss and low-latency traffic, AF service may provide assurance of delivery under prescribed condition, and BE service may have the lowest priority and may be delivered when there are available bandwidths. For example, an EPoC network may be used to deliver triple-play services, such as data, voice, and video. The data traffic may require BE delivery, while voice and video traffic may have strict real time requirements and may require EF delivery. In some embodiments, LLIDs may be mapped to CoS, thus transmission queues sorted by LLIDs or CoS may be equivalent.

It should be noted that the DBA scheme discussed herein may equally apply to upstream and/or downstream scheduling and/or in any hybrid access networks comprising a fiber feeder network (e.g. EPON, Gigabit PON (GPON), or Next Generation EPON (NGEPON)) coupled to any wired or wireless electrical based distribution networks (e.g. coaxial, xDSL, powerline, WiFi). The disclosed DBA scheme may be performed at any head end systems, central access nodes, and/or equipment (e.g. OLT, cable modem termination system (CMTS), etc) in a hybrid access network with fiber line access.

In an embodiment of the RTT-aware DBA, the inter ONU/CNU scheduling and intra ONU/CNU scheduling may be formulated as an optimization problem with an objective of maximizing upstream and/or downstream channel throughput and utilization. An EPoC network, such as network 100, may comprise an OLT (e.g. OLT 110), $N_{ONU}$ number of ONUs (e.g. ONUs 170) and $N_{CNU}$ number of CNUs (e.g. CNUs 130). Thus, the total number of network units, $N_{NU}$ communicating with the OLT may be $N_{ONU}+N_{CNU}$. When solving for the optimal solution, the list of variables described in Table 1 below may be considered:

TABLE 1

RTT-aware DBA Parameters

| Variables | Descriptions |
| --- | --- |
| $RTT_i$ | Round-trip time for a network unit i. |
| $T_G$ | Time required to send a Gate message. |
| $T_R$ | Time required to send a Report message. |
| $T_g$ | Guard time required between transmission time slots from different ONUs/FCUs. |
| S | Line rate of optical fiber. |
| $N_C$ | Number of input transmission queues in each ONU/CNU, each queue may represent a CoS. Transmission queues may be arranged in terms of priorities (e.g. in increasing or decreasing priorities). Each Report message may include statuses of one or more or all transmission queues. |
| $z_{i,j}$ | If $z_{i,j} = 1$, then CNU i and CNU j are in the same coax plant (e.g. connecting to the same FCU). |
| $Th_{ij}^{min}$ | Minimum bandwidth that may be guaranteed to a network unit i for traffic class j, which may be configured according to SLA. |
| $B_{ij}^{min}$ | Minimum transmission time slots that may be guaranteed to a network unit i for traffic class j in a scheduling cycle. |
| $B_{ij}^{max}$ | Maximum transmission time slot that may be allocated to a network-unit i for traffic class j in a scheduling cycle. |
| $T_{cycle}^{max}$ | Maximum cycle time (e.g. the maximum size of total upstream transmission in a scheduling cycle). |
| $T_{cycle}(k)$ | Cycle time for the $k^{th}$ scheduling cycle. |
| $R_{ij}(k)$ | Length of the $j^{th}$ transmission queue in the $i^{th}$ network unit, $1 \le i \le N_{NU}$, $1 \le j \le N_c$, for the $k^{th}$ scheduling cycle (e.g. in a Report messages received in the $k^{th}$ scheduling cycle). |

An allocation may be described by the list of variables as shown below in Table 2:

TABLE 2

Allocation Parameters

| Variables | Descriptions |
| --- | --- |
| $a_h^{start}(k)$ | Start time of the $h^{th}$ allocation in the $k^{th}$ scheduling cycle |
| $a_h^{length}(k)$ | Length of the $h^{th}$ allocation in the $k^{th}$ scheduling cycle |
| $a_h^{NU}(k)$ | Target ONU/CNU for the $h^{th}$ allocation in the $k^{th}$ scheduling cycle |
| $a_h^C(k)$ | Target CoS for the $h^{th}$ allocation in the $k^{th}$ scheduling cycle |
| $a_{ij}(k)$ | Timeslots allocated to a network unit i for traffic class j in the $k^{th}$ scheduling cycle |
| $a_{ij}^{start}(k)$ | Start time of timeslot allocated to a network unit i for traffic class j in the $k^{th}$ scheduling cycle. |

An objective function may be formed to maximize upstream bandwidths as shown below:

$$(t_1^{start}(k) - t^{start}(k)) + \Sigma_{h=1}^{N_{NU} \times N_C - 1} t_{h+1}^{start}(k) - (t_h^{start}(k) + a_h^{length}(k)) \quad (1)$$

The objective function may also be formulated by maximizing throughput as shown below:

$$\text{Maximize} = \frac{\sum_{h=1}^{N_{NU} \times N_C} a_h^{length}(k)}{T_{cycle}(k)} \quad (2)$$

The objective function may be subjected to constraints, such as allocation time slot boundary, guaranteed bandwidth, scheduling cycle delay, and maximum scheduling cycle time.

The time slot boundary constraint may be expressed as:

$$t_{h+1}^{start}(k) \ge \begin{cases} t_h^{start}(k) + a_h^{length}(k), & \text{if } a_h^{NU}(k) = a_{h+1}^{NU}(k) \\ t_h^{start}(k) + a_h^{length}(k) + T_R, & \text{if } a_h^{NU}(k), a_{h+1}^{NU}(k) \in CNU \\ & \text{and } z_{a_h^{NU}(k), a_{h+1}^{NU}(k)} = 1 \\ t_h^{start}(k) + a_h^{length}(k) + T_R + T_G, & \text{otherwise} \end{cases} \quad (3)$$

The guaranteed bandwidth constraint may be expressed as:

$$\frac{a_{i,j}(k)}{T_{cycle}(k)} \times S \ge Th_{i,j}, \forall i, j, k: 1 \le N_{NU}, 1 \le N_C, k > 0 \quad (4)$$

The scheduling cycle delay constraint may be expressed as:

$$a_{i,j}^{start}(k+1) - a_{i,j}^{start}(k) \le w(j) \times T_{cycle}^{max}, \forall i,j,k:$$
$$1 \le i \le N_{NU}, 1 \le j \le N_C, k > 0 \quad (5)$$

where w(j) is a function that may specify the weight for different classes of service and typically w(1)=1 and w(j) may increase with j.

The RTT-aware DBA scheme may apply the RTT constraint to incorporate RTTs of all network units during scheduling. The RTT constraint may be expressed as:

$$t^{start}(k) + i \times T_{gate} + RTT_i \le a_{i,j}(k), \forall i,j,k: 1 \le i \le N_{NU}, k > 0 \quad (6)$$

The maximum scheduling cycle time constraint may be expressed as:

$$(a_{N_{NU} \times N_C}^{start}(k) + a_{N_{NU} \times N_C}^{length}(k)) - t^{start}(k) \le T_{cycle}^{max}, \forall k: k > 0 \quad (7)$$

As noted above, similar equations may be employed to model downstream allocations.

Figure 5:
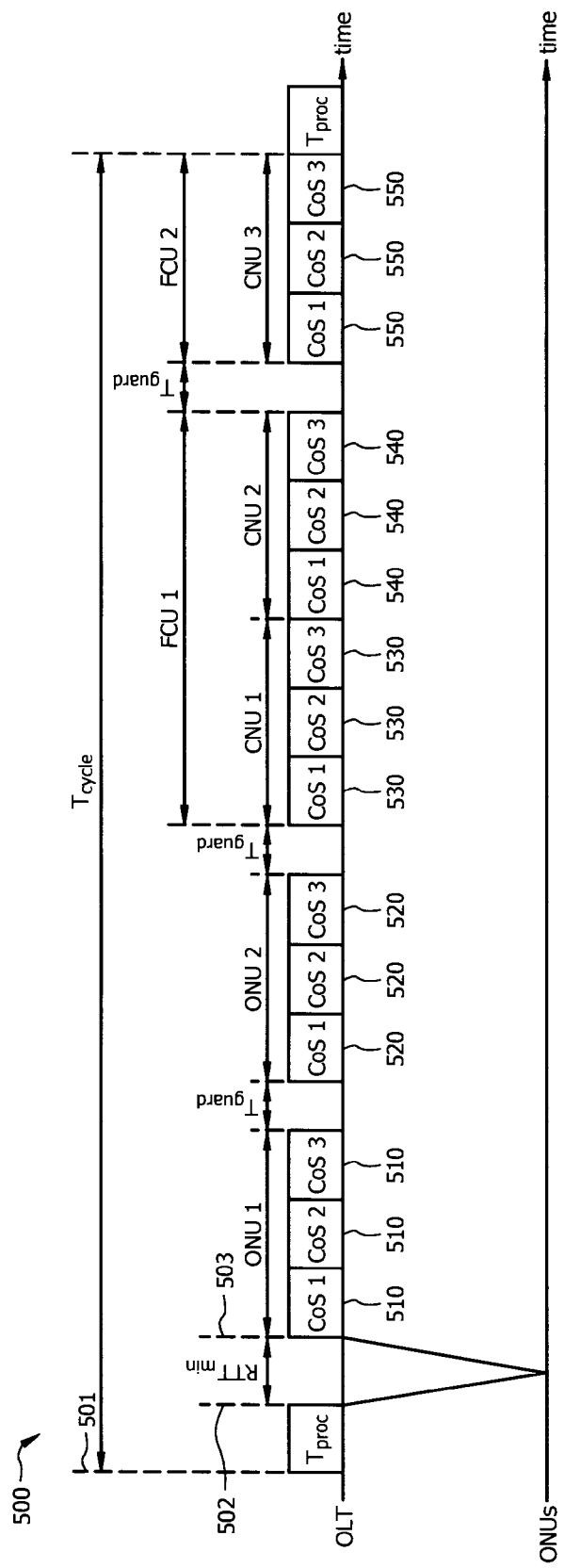
FIG. 5 is a timing diagram of an embodiment of a round trip time-aware (RTT-aware) dynamic bandwidth allocation (DBA) method.

FIG. 5 is a timing diagram of an embodiment of an RTT-aware DBA method 500, which may be implemented at an OLT, such as OLT 110, in a unified optical-coaxial network, such as network 100. According to method 500, an OLT may perform the RTT-aware DBA at the beginning of a scheduling cycle at time 501. The OLT may schedule upstream transmission time slots based on Report messages received from ONUs, FCUs, and/or CNUs, such as ONUs 170, FCUs 120, and/or CNUs 130, respectively, in a previous scheduling cycle and RTTs of the ONUs, FCUs, and/or CNUs. At time 502, the OLT may complete the processing of the RTT-aware DBA (e.g. processing period of $T_{proc}$) and may send Gate messages to the ONUs, FCUs, and/or CNUs.

In method 500, the OLT may perform inter-ONU/CNU scheduling by sorting the ONUs and CNUs in an increasing order of ONUs' and CNUs' RTTs and then allocating upstream transmission time slots to the ONUs and CNUs in the sorted order. As such, the ONU with the minimum RTT delay, denoted as $RTT_{min}$, may be scheduled to transmit first in the scheduling cycle (e.g. at time 503). The average distances between an OLT and EPON ONUs may be about 10 to about 20 km, and the average distances between an FCU and CNUs may be about 100 to about 500 m. Thus, ONUs' RTTs may be smaller than CNUs' RTTs. As shown in the timing diagram 500, the ONUs may be allocated with earlier transmission time slots (e.g. slots 510 and 520) than the CNUs (e.g. slots 530, 540, and 550) in the scheduling cycle. The inter-ONU/CNU scheduling order may minimize bandwidth utilization loss due to the RTT-effect as described with respect to timing diagram 300. When the RTTs are uniform and the allocation to each ONU and CNU is larger than the length of a Gate message, the upstream channel wastage per scheduling cycle may be $RTT_{min}$. In addition to scheduling according to the ONUs' and CNUs' RTTs, the OLT may group allocations (e.g. slots 530 and 540) for CNUs in the same coax plant connecting to the same FCU together. Thus, the number of guard intervals may be minimized when grouping allocations for CNUs connecting to the same FCU as no guard interval may be required between CNUs coupled to a common FCU.

In method 500, the OLT may perform intra-ONU/CNU scheduling in addition to inter-ONU/CNU scheduling. The OLT may assign contiguous upstream transmission time slots to transmission queues within an ONU (e.g. slots 510 or 520) and/or a CNU (e.g. slots 530, 540, or 550). The intra-ONU/CNU scheduling order may also minimize the number of guard intervals, where the maximum savings per cycle may be about $(N_{CNU} \times N_C - N_{FCU}) \times T_g$, where $N_{CNU}$, $N_C$, $N_{FCU}$, and $T_g$ are variables as described above with respect to Table 1 and Table 2. In method 500, the OLT may also sort transmission queue statuses based on CoS and assign allocations to the transmission queues based on priorities to provision for QoS. For example, method 500 may allocate transmission queues in the order of CoS 1, CoS 2, and CoS 3, where CoS 1, CoS 2, and Cos 3 may represent EF, AF, and BE traffic, respectively. Thus, method 500 may improve upstream channel utilization by reducing idle time due to RTT effect and number of guard intervals by grouping allocations as described. In addition, method 500 may only require each ONU and/or CNU to send a single Report message to update statuses of all transmission queues per scheduling cycle.

Figure 6:
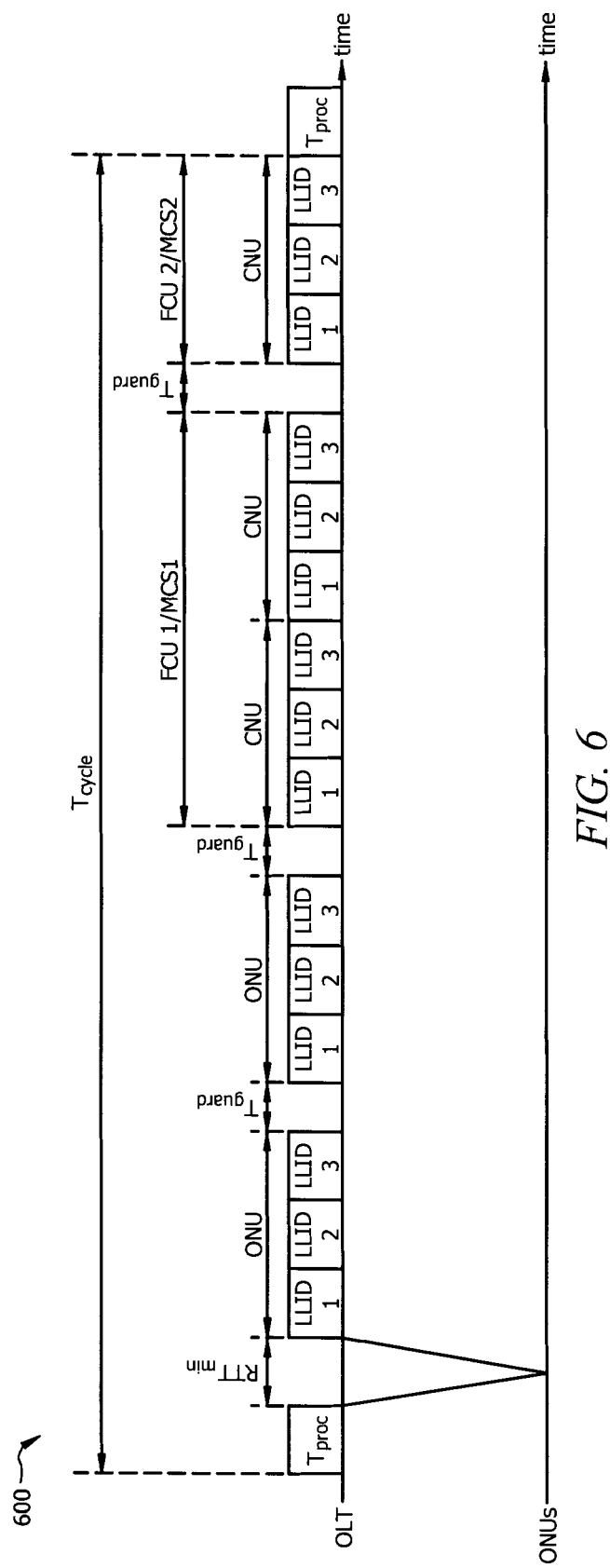
FIG. 6 is a timing diagram of another embodiment of an RTT-aware DBA method.

FIG. 6 is a timing diagram of another embodiment of an RTT-aware DBA method 600, which may be implemented on an OLT, such as OLT 110, in a unified optical-coaxial network, such as network 100. Method 600 may perform substantially similar inter-ONU/CNU scheduling and intra ONU/CNU scheduling as described in method 500, but the allocations or transmission queues may be grouped by LLIDs instead of CoS. It would be understood by those skilled in the art that the principles of grouping allocations illustrated by the examples in method 500 or 600 are not limited to CoS or LLIDs. For example, allocations may also be grouped by Modulation Coding Schemes (MCSs), service identifiers (SIDs), or any other schemes. When the OLT allocates contiguous transmission time slots to the CNUs connecting to the same FCU and to the transmission queues belonging to the same CNU or ONU, the number of guard intervals may be minimized.

Figure 7:
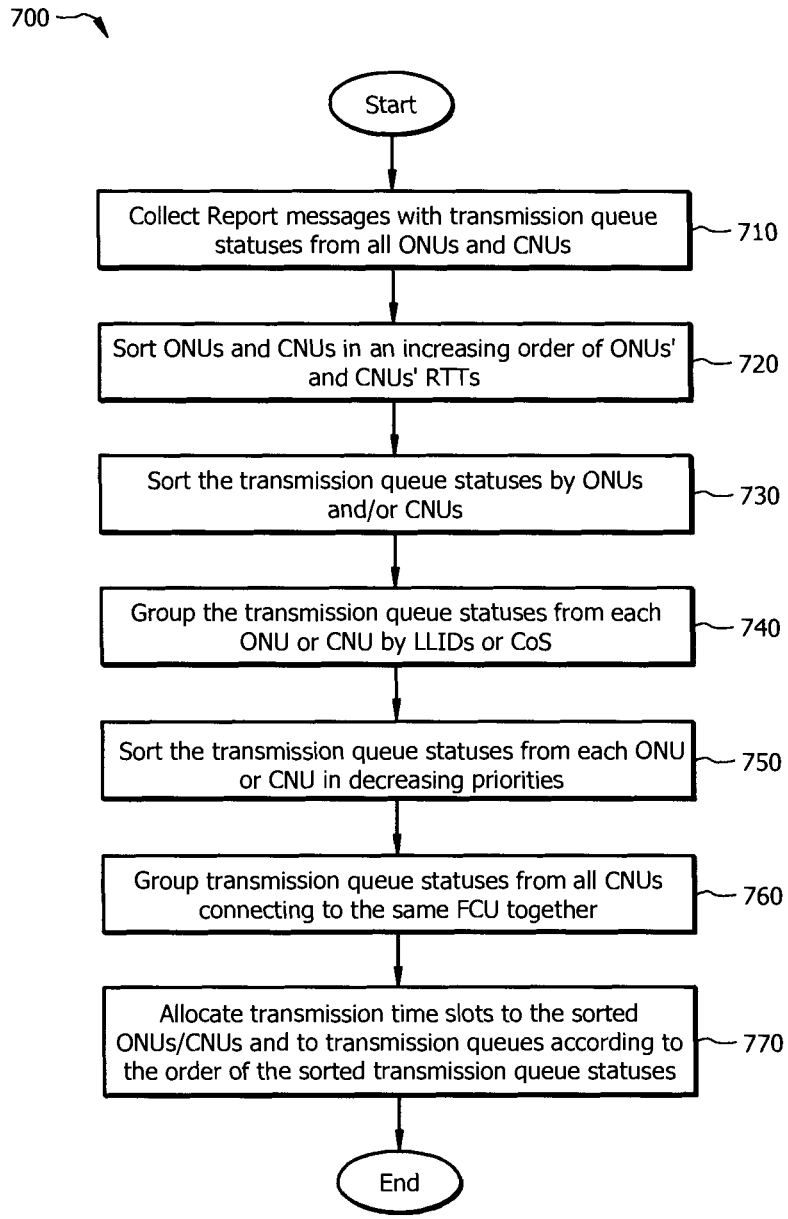
FIG. 7 is a flowchart of an embodiment of an RTT-aware DBA method.

FIG. 7 is a flowchart of an embodiment of an RTT-aware DBA method 700, which may be implemented on an OLT (e.g. OLT 110) during upstream scheduling as described in method 500 and/or 600. The method 700 may be described in the context of an upstream scheduler in a unified optical-coaxial network, such as network 100. However, those skilled in the art will appreciate that the principles set forth in method 700 are not limited to the embodiment illustrated in FIG. 1 and/or may equally apply to a downstream scheduler. The method 700 may begin with collecting Report messages from all ONUs (e.g. ONUs 170) and CNUs (e.g. CNUs 130) in a scheduling cycle at step 710. Each Report message may comprise one or more transmission queue statuses of an ONU or a CNU. A new scheduling cycle may begin after receiving all Report messages from the ONUs and CNUs. At step 720, method 700 may sort the ONUs and CNUs in an increasing order of ONUs' and CNUs' RTTs. At step 730, method 700 may sort the transmission queue statuses by the ONUs and/or CNUs. After sorting all the transmission queue statuses by the ONUs and/or CNUs, method 700 may group the transmission queue statuses within each ONU or CNU by LLIDs or CoS at step 740. Each LLID or CoS may be assigned with a delivery priority based on QoS (e.g. specified in network configuration or SLA). Thus, at step 750, method 700 may sort the transmission queue statuses in decreasing priorities. At step 760, method 700 may group transmission queue statuses from the CNUs connecting to a common FCU (e.g. FCU 120) together. At step 770, method 700 may allocate upstream transmission time slots in the new scheduling cycle to the CNUs and/or ONUs in the same order as sorted by step 720 (e.g. increasing RTTs) and to the transmission queues of each ONU and/or CNU in the order as sorted by steps 730 to 760. It should be noted that method 700 may be used to schedule the order of the upstream transmissions, while the length (e.g. duration) of the upstream transmission time slots may be assigned according to the transmission queue statuses (e.g. number of bytes). In the case of a downstream scheduler, method 700 may allocate downstream transmission time slots based on OLT's downstream transmission queue statuses.

Figure 8:
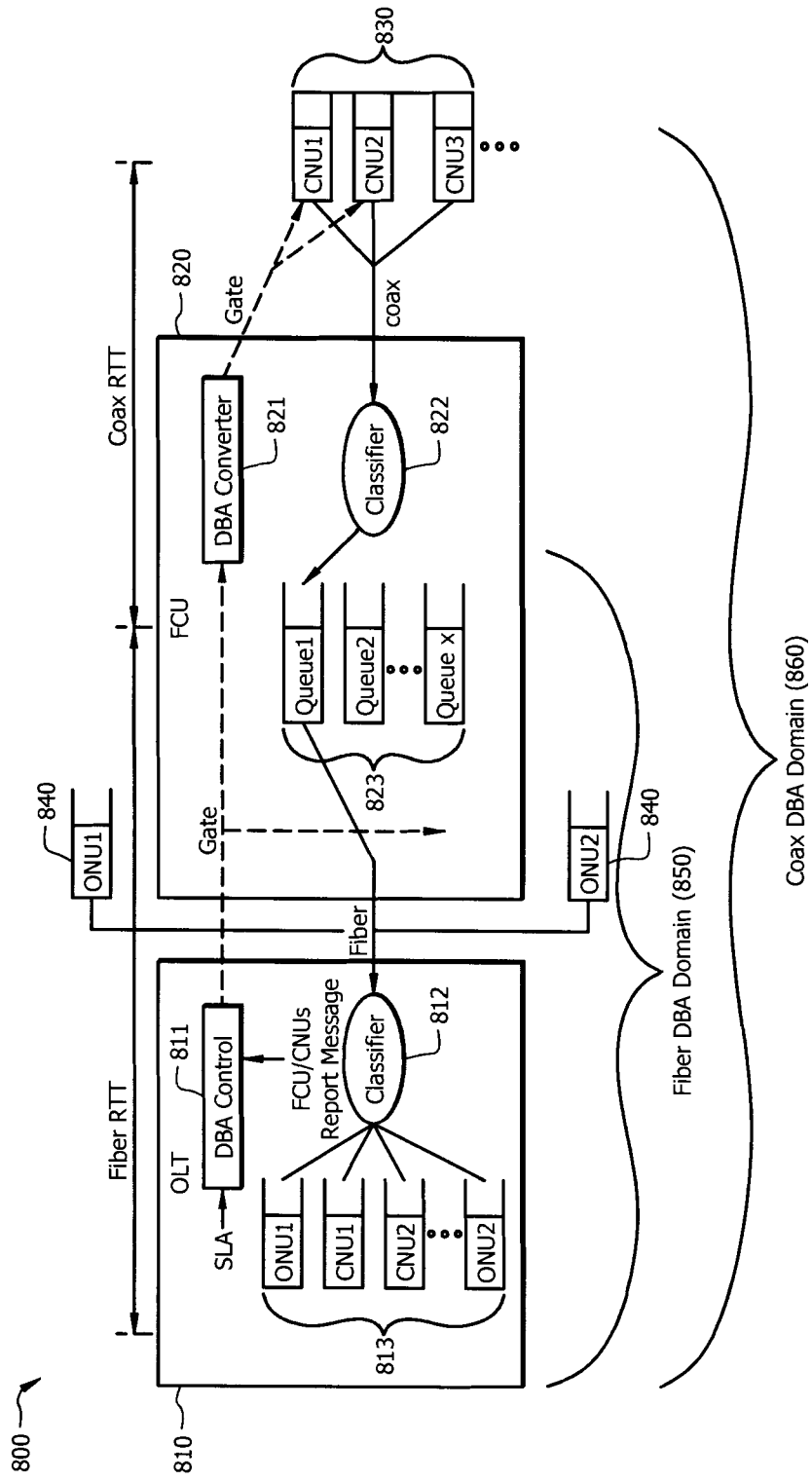
FIG. 8 is a schematic diagram of an embodiment of a centralized RTT-aware DBA architecture.
Figure 10:
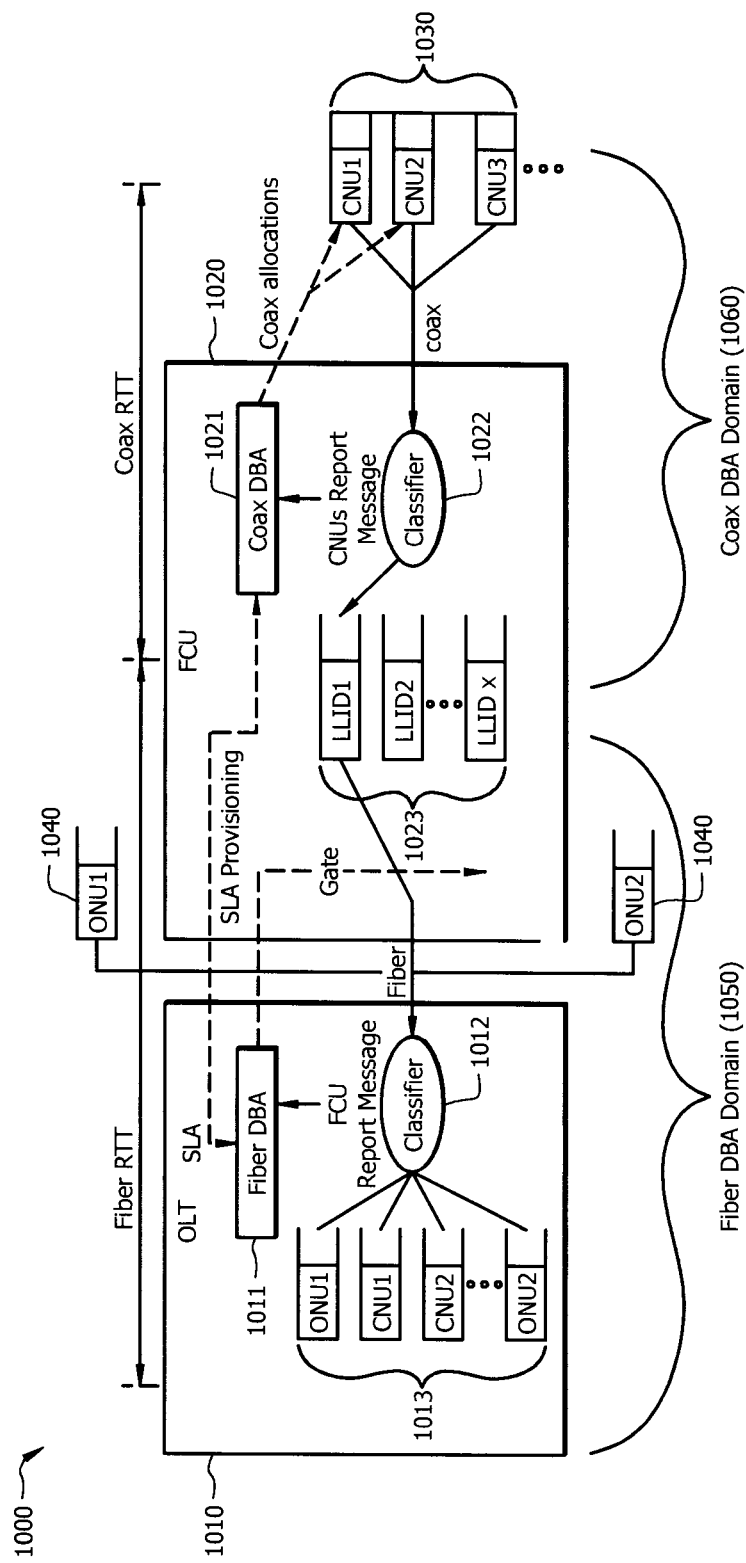
FIG. 10 is a schematic diagram of an embodiment of a distributed RTT-aware DBA architecture.

In an embodiment of an EPON and/or EPoC network, DBA may be centralized or distributed. A centralized DBA may refer to a bandwidth allocation scheme where an OLT (e.g. OLT 110) may control all channel access by assigning bandwidths to ONUs (e.g. ONUs 170) and CNUs (e.g. CNUs 130) directly and may arbitrate transmissions of different priority traffic within each ONU and CNU. A distributed DBA may refer to a bandwidth allocation scheme where an OLT may schedule CNUs' transmissions via an FCU (e.g. FCU 120), and each ONU and CNU may also schedule the ONU's and CNU's internal transmission queues, respectively. The disclosed RTT-aware DBA scheme may be applied to a centralized or distributed DBA architecture. FIGS. 8 and 10 depict example embodiments of RTT-aware DBA architectures. FIGS. 8 and 10 contrast a centralized architecture and a distributed architecture in terms of upstream scheduling for EPoC CNUs. It should be noted that the example embodiments of FIGS. 8 and 10 could also be implemented to include EPON ONUs.

FIG. 8 is a schematic diagram of an embodiment of a centralized RTT-aware DBA architecture 800. The centralized RTT-aware architecture 800 may comprise an OLT 810, a plurality of ONUs 840, an FCU 820, and a plurality of CNUs 830, which may be substantially similar to OLT 110, ONUs 170, FCU 120, and CNUs 130, respectively. The centralized RTT-aware DBA architecture 800 may be divided into a fiber DBA domain 850 and a coax DBA domain 860. The fiber DBA domain 850 may be defined between OLT 810 and FCU 820 and/or ONUs 840. The coax DBA domain 860 may be defined between OLT 810 and CNUs 830.

The OLT 810 may comprise a centralized DBA controller 811, a classifier 812, and a plurality of data queues 813. The DBA controller 811 may be configured to arbitrate all upstream transmissions by dynamically allocating upstream optical transmission time slots to ONUs 840 and/or FCU 820 in the fiber DBA domain 850 and CNUs 830 in the coax DBA domain 860 according to Report messages received from FCU 820 and/or CNUs 830 and may consider RTTs in the fiber domain (e.g. between OLT 810 and FCU 820), RTTs in the coax domain (e.g. between FCU 820 and CNUs 830), and SLA. In addition, the DBA controller 811 may be configured to forecast FCU's 820 upstream traffic from CNUs 830 according to CNUs' 830 Report messages and coax RTT. The classifier 812 may be configured to classify data received from ONUs 840 and/or FCU 820 according to CoS, LLIDs, or other schemes. The data queues 813 may buffer data received from ONUs 840 and/or FCU 820. The OLT 810 may be configured to transmit Gate messages comprising the transmission time slots allocated by the DBA controller 811 to ONUs 840, FCUs 820, and/or CNUs 830, and receive Report messages and data from ONUs 840 and/or FCUs 820 in the granted transmission time slots.

The FCU 820 may comprise a DBA converter 821, a classifier 822, and a plurality of data queues 823. The DBA converter 821 may be configured to convert optical transmission time slots allocated by OLT 810 for CNUs 830 into coaxial communication channel resources (e.g. PRBs), and may generate UL-MAPs comprising the coaxial allocations. The classifier 822 may be configured to classify data received from CNUs 830 according to CoS, LLIDs, or other schemes. The data queues 823 may buffer data received from CNUs 830 in the allocated coax allocations. The FCU 820 may be configured to transmit the UL-MAPs to CNUs 830, receive data from CNUs in the allocated coax allocations, and transmit data buffered in data queues 823 to OLT 810 in the granted transmission time slots. The CNUs 830 may comprise a plurality of internal transmission queues for buffering data that are ready to be sent to OLT 810.

Figure 9:
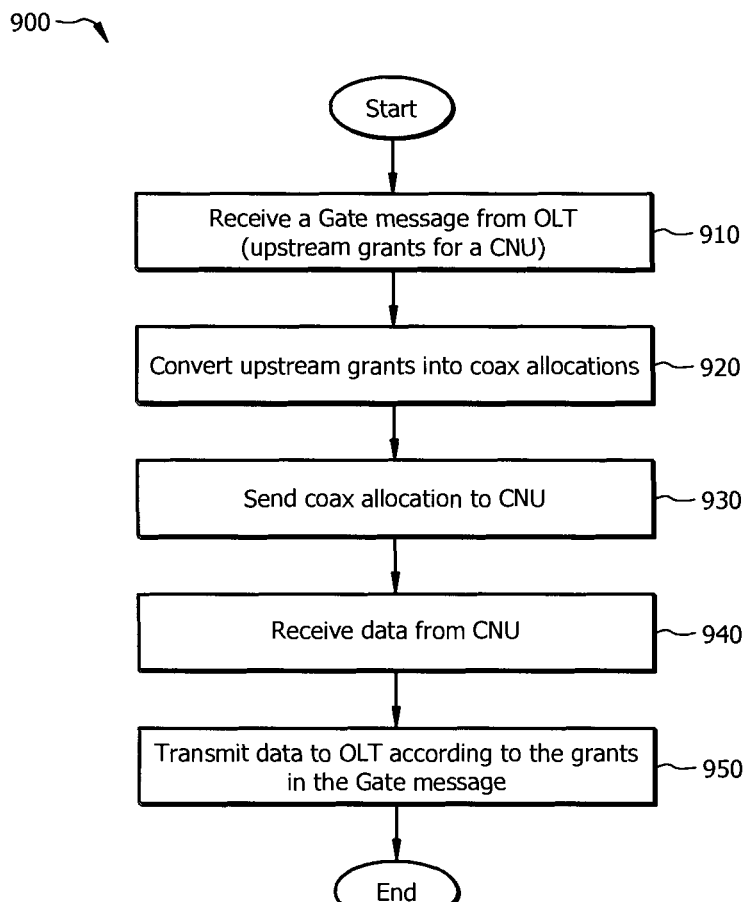
FIG. 9 is a flowchart of an embodiment of a DBA conversion method in a centralized RTT-aware DBA architecture.

FIG. 9 is a flowchart of an embodiment of a DBA conversion method 900, which may be implemented on an FCU, such as FCU 120, or any other media converter units during upstream scheduling as described in the centralized RTT-aware DBA architecture 800. The method 900 may begin with receiving a Gate message from an OLT (e.g. OLT 110) at step 910. The Gate message may comprise one or more upstream grants for a CNU (e.g. CNU 130). Each upstream grant may specify a start time and a length of a transmission time slot in which CNU's data may be transmitted. At step 920, method 900 may convert the upstream grants into coax allocations (e.g. PRBs) for the CNUs. At step 930, method 900 may transmit the coax allocations (e.g. in the form of a UL-MAP) to the CNU. At step 940, method 900 may receive data from the CNU in the converted coax allocations, buffer the data, and wait for the upstream transmission time slots specified in the Gate message received at step 910. At step 950, method 900 may transmit the data to the OLT in the granted upstream transmission time slots. It should be noted that method 900 may be repeated for each Gate message or may combine the coax allocation conversions for multiple CNUs when multiple Gate messages are received.

FIG. 10 is a schematic diagram of an embodiment of a distributed RTT-aware DBA architecture 1000. The distributed RTT-aware architecture 1000 may comprise an OLT 1010, a plurality of ONUs 1040, an FCU 1020, and a plurality of CNUs 1030, which may be substantially similar to OLT 110, ONUs 170, FCU 120, and CNUs 130, respectively. In the distributed RTT-aware architecture 1000, the coax scheduling may be distributed between the OLT 1010 and FCU 1020. For example, a fiber DBA domain 1050 may be defined between the OLT 1010 and the ONUs 1040 and/or FCU 1020 and a coax DBA domain 1060 may be defined between FCU 1020 and CNUs 1030.

The OLT 1010 may comprise a fiber DBA controller 1011, a classifier 1012, and a plurality of data queues 1013. The fiber DBA controller 1011 may be configured to schedule upstream transmissions for ONUs 1040 and/or FCU 1020 according to Report messages received from ONUs 1040 and/or FCU 1020 and SLA. The classifier 1012 may be configured to classify data received from ONUs 1040 and/or FCU 1020 according to CoS, LLIDs, or other schemes. The data queues 1013 may buffer data received from ONUs 1040 and/or FCU 1020. The OLT 1010 may be configured to transmit Gate messages comprising the transmission time slots allocated by the DBA controller 1011 to ONUs 1040 and/or FCUs 1020, and receive Report messages and data from ONUs 1040 and/or FCUs 1020 in the granted transmission time slots.

The FCU 1020 may comprise a coax DBA controller 1021, a classifier 1022, and a plurality of data queues 1023. The coax DBA controller 1021 may be configured to schedule coax channel resources (e.g. PRBs carried in UL-MAPs) for CNUs 1030 to transmit upstream data according to Report messages received from CNUs 1030 and SLA provisioning extended from OLT 1010. In addition, the coax DBA controller 1021 may be configured to consider the CNUs' 1030 RTTs during coax scheduling. The classifier 1022 may be configured to classify data received from CNUs 1030 according to CoS, LLIDs, or other schemes. The data queues 1023 may buffer data received from CNUs 1030. The FCU 1020 may be configured to transmit the UL-MAPs to CNUs 1030, receive Report messages and data from CNUs in the allocated coax allocations, and transmit data buffered in data queues 1023 to OLT 1010 in the granted transmission time slots. The CNUs 1030 may comprise a plurality of internal transmission queues that are ready to be sent to FCU 1020.

Figure 11:
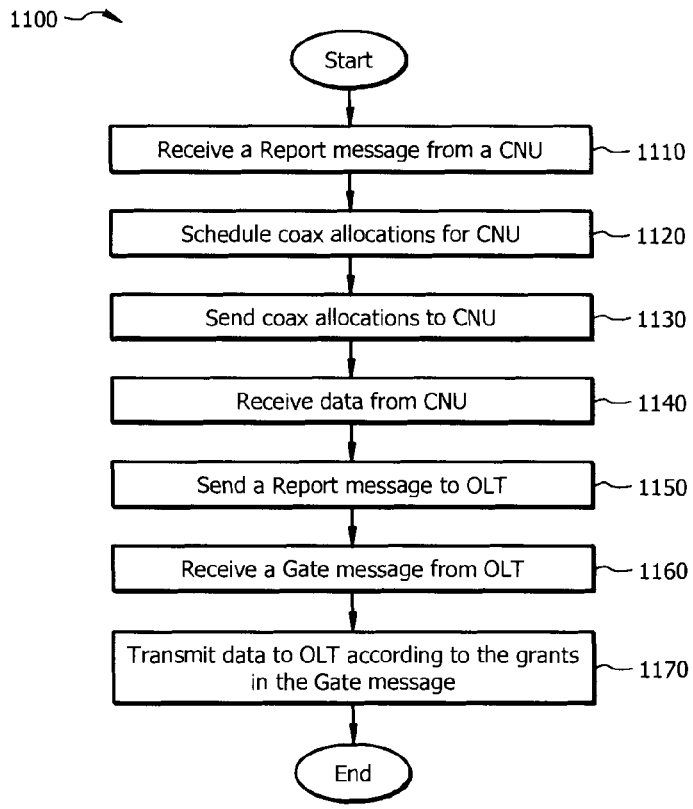
FIG. 11 is a flowchart of an embodiment of a coaxial (coax) DBA scheduling method in a distributed RTT-aware DBA architecture.

FIG. 11 is a flowchart of an embodiment of a coax DBA scheduling method 1100, which may be implemented on an FCU, such as FCU 120, or other media converter units during upstream scheduling as described in the distributed RTT-aware DBA architecture 900. The method 1100 may begin with receiving a Report message from a CNU, such as CNU 130, in step 1110. The Report message may comprise one or more CNU's transmission queue statuses. At step 1120, method 1100 may schedule coax allocations (e.g. PRBs) for the CNU according to the received transmission queue statuses. At step 1130, method 1100 may send the scheduled coax allocations (e.g. in a UL-MAP) to the CNU. At step 1140, method 1100 may receive data from the CNU in the scheduled coax allocations and may buffer the data in internal transmission queues. At step 1150, method 1100 may send a Report message to an OLT, such as OLT 110, to report internal transmission queue statuses. At step 1160, method 1100 may receive a Gate message from the OLT with one or more upstream grants. At step 1170, method 1100 may transmit data to the OLT in the transmission windows specified by the upstream grants. It should be noted that method 1100 may be repeated for each CNU's Report message or may combine multiple CNUs' Report messages when scheduling coax allocations.

The RTT-aware DBA performance may be evaluated in terms of average packet delays and average packet loss ratios in an EPoC network, such as network 100, via simulation. For example, a simulator may be configured with an EPoC network comprising an OLT (e.g. OLT 110), 16 ONUs (e.g. ONUs 170), 8 FCUs (e.g. FCUs 120), and each FCU may be connected to 8 CNUs (e.g. CNUs 130). The network traffic may be generated by using a self-similar traffic model. Self-similar traffic may refer to traffic with a similar pattern when viewed at different times, where a traffic pattern at any time instants may be positively correlated with traffic patterns at all future time instants. In the simulator, self-similar traffic may be generated by aggregating multiple sub-streams that may include alternating Pareto-distributed ON/OFF periods to simulate traffic burst. The load of a sub-stream, $\lambda$, may be expressed as:

$$\lambda = \frac{E[ON]}{E[ON] + E[OFF]} \quad (8)$$

where $E[ON]$ and $E[OFF]$ may be expected lengths of on and off periods, respectively. The expected length of an on period $E[ON]$ may be specified in the simulator. The simulator may configure all sub-streams with equal loads and compute the length of an off period $E[OFF]$ based on a target load as shown below:

$$E[OFF] = E[ON] \times \left(\frac{1}{\lambda} - 1\right) \quad (9)$$

In an embodiment, the RTT-aware DBA may apply a limited allocation scheme, an excess distribution scheme, or any other allocation schemes. In the limited allocation scheme, each class of service may be allocated with a minimum bandwidth as shown below:

$$a_{i,j}(k) = \begin{cases} R_{i,j}(k) & \text{if } R_{i,j} < B_{i,j}^{min} \\ B_{i,j}^{min} & \text{if } R_{i,j} \geq B_{i,j}^{min} \end{cases} \quad (10)$$

where $a_{i,j}(k)$, $R_{i,j}(k)$, $B_{i,j}^{min}$ may be as defined in Table 1 and 2 described above. It should be noted that the minimum bandwidth is a designed parameter that may be selected based on network configurations and SLA.

In the excess distribution allocation scheme, surplus bandwidth may be saved from the lightly loaded network units that require less than the minimum guaranteed bandwidth and may be distributed among the highly loaded network units which require more than the minimum guaranteed bandwidth. The allocation $a_{i,j}(k)$ with excess distribution allocation scheme may be described as below:

$$a_{i,j}(k) = \begin{cases} R_{i,j}(k) & \text{if } R_{i,j} < B_{i,j}^{min} \\ B_{i,j}^{min} + B_{i,j}^{excess} & \text{if } R_{i,j} \geq B_{i,j}^{min} \end{cases} \quad (11)$$

where $R_{i,j}(k)$, $B_{i,j}^{min}$ may be as defined in Table 1 described above, and $B_{i,j}^{excess}$ may be the surplus or excess bandwidth allocated for each network unit, which may be commted as:

$$B_{i,j}^{excess} = \frac{R_{i,j}}{\sum_{i=1}^{N_{NU}} \sum_{j=1}^{N_C} R_{i,j}} \times B_{total}^{excess} \quad (12)$$

The variables $N_{NU}$, $N_c$ may be as defined in Table 1, and $B_{total}^{excess}$ may be the total excess bandwidth, which may be expressed as:

$$B_{total}^{excess} = \sum_{i=1}^{N_{NU}} \sum_{j=1}^{N_C} (B_{i,j}^{min} - R_{i,j}) \text{ where } R_{i,j} < B_{i,j}^{min} \quad (13)$$

The RTT-aware DBA simulation may be configured with the parameters listed in Table 3 below:

TABLE 3

| Simulation Parameters | |
| --- | --- |
| Distance between OLT and ONUs/FCUs | Uniform in range [10 km, 40 km] |
| Distance between FCU and CNUs | Uniform in range [200 m, 1 km] |
| Signal delay in fiber and coax | 5 ns/m |
| No. of ONUs/FCUs/CNUs | 16/8/64 |
| Data rate of upstream link from OLT to ONU | 1 gigabits per second (Gbps) |
| Data rate of user port | 100 megabits per second (Mbps) |
| Buffer sizes in ONUs and CNUs | 1 Megabyte |
| OFDM symbol duration | 40 us |
| Bit-loading capacities of PRBs | 8/10/12 bits |

Figure 12:
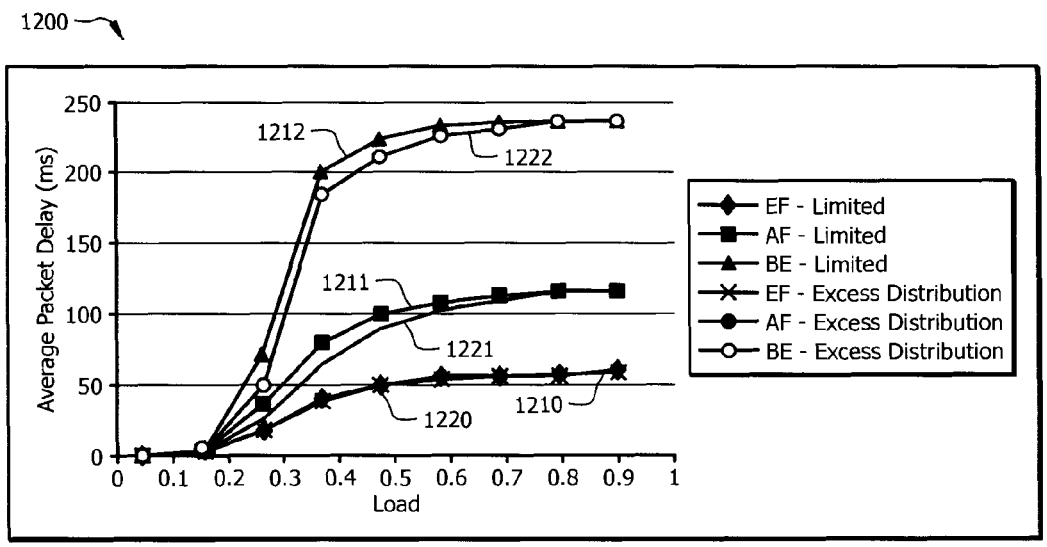
FIG. 12 illustrates an embodiment of averaged packet delay curves at coaxial network units (CNUs).
Figure 13:
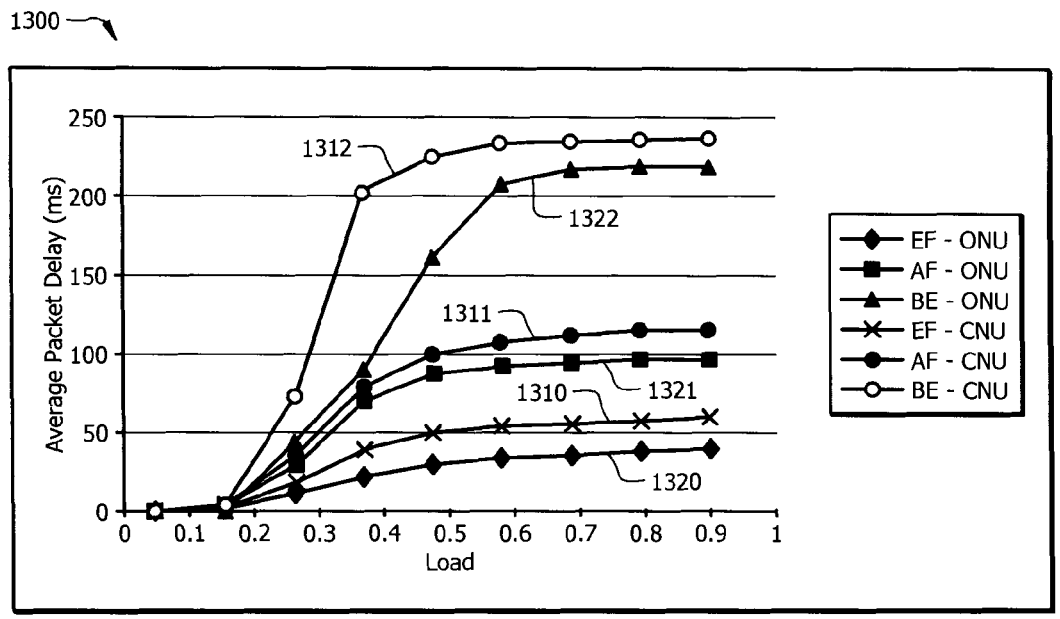
FIG. 13 illustrates another embodiment of averaged packet delay curves at CNUs and optical network units (ONUs).
Figure 14:
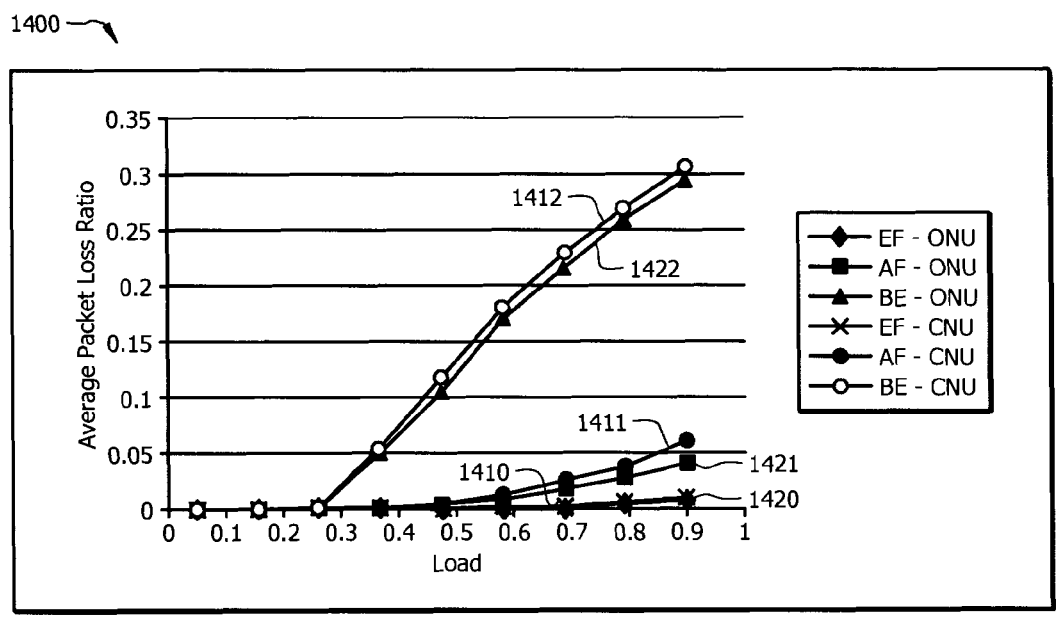
FIG. 14 illustrates an embodiment of averaged packet loss ratio curves at CNUs and ONUs.

The performance may be measured when the EPoC network is at a steady state (e.g. after all network units are registered). The performance may be measured for an EF service, an AF service, and a BE service. FIGS. 12-14 depict averaged packet delays and averaged packet loss ratios measured from the simulation FIG. 12 is a graph 1200 illustrating averaged packet delays at CNUs for the limited and excess distribution schemes. The x-axis may represent offered load (e.g. as shown in equation (8)) in the range of zero to one. The y-axis may represent average packet delays in units of ms. In graph 1200, curves 1210, 1211, 1212, 1220, 1221, and 1222 are plots of average packet delays as a function of offered load. The curves 1210, 1211, and 1212 may correspond to average packet delays at the CNUs when employing the limited distribution scheme for EF, AF, and BE services, respectively. The curves 1220, 1221, and 1222 may correspond to average packet delays computed at the CNUs when employing the excess distribution scheme for EF, AF, and BE services, respectively. As shown in the curves 1210 and 1220, the delays for EF traffic for both limited and excess distribution schemes may be similar since EF traffic may comprise delay sensitive traffic and both allocation schemes may be designed with a minimum guaranteed bandwidth higher than the requested bandwidth. By comparing the AF curves 1211 and 1221, and the BE curves 1212 and 1222, the excess distributed scheme may provide better delays at lower loads when the excess bandwidth saved from EF traffic may be distributed among the AF and BE traffic. However, the delays for both schemes may converge at higher loads as there may be no excess bandwidth to distribute.

FIG. 13 is a graph 1300 illustrating averaged packet delay at CNUs and ONUs for the excess distribution scheme. The x-axis may represent offered load in the range of zero to one. The y-axis may represent average packet delays in units of ms. In graph 1300, curves 1310, 1311, and 1312 are plots of average packet delays computed at CNUs as a function of offer load, whereas curves 1320, 1321, and 1322 are plots of average packet delays computed at ONUs as a function of offer load. As shown in graph 1300, the delays at the ONUs and CNUs for EF, AF, and BE traffic may be comparable and may show similar trends. The delays at the CNUs may be slightly higher as expected due to the additional coaxial delays. The delays for both EF (e.g. curves 1310 and 1320) and AF (e.g. curves 1311 and 1321) traffic may be within about 60 ms and about 120 ms, respectively, for both ONUs and CNUs. This observation may be expected because both EF and AF classes of service may have guaranteed bandwidth and delay, and thus at high loads the EF and AF classes get preference over BE, which may not have guaranteed bandwidth and delay. As shown in curves 1312 and 1322, the delay for BE may increase rapidly as the load exceeds about 0.3, and then the delay may remain at about 230 ms at loads higher than about 0.5 as packets may start to drop. It should be noted that graph 1300 may only show the average packet delays for the excess distribution scheme for graph clarity, but the limited scheme may have similar trends and results.

FIG. 14 is a graph 1400 illustrating averaged packet loss ratio curves at ONUs and CNUs for the excess distribution scheme. The x-axis may represent offered load in the range of zero to one. The y-axis may represent average packet delays in units of ms. In graph 1400, curves 1410, 1411, and 1412 are plots of average packet loss ratios computed at CNUs as a function of offer load, whereas curves 1420, 1421, and 1422 are plots of average packet loss ratios computed at ONUs as a function of offer load. As shown in graph 1400, the packet loss may be about zero for EF (e.g. curves 1410 and 1420) traffic and very low for AF traffic (e.g. curves 1411 and 1421) even at high loads since EF and AF traffic may be get precedence over BE traffic. As shown in curves 1412 and 1411, packet loss may increase for BE traffic at loads higher than about 0.3 as buffers may start to overflow, and may reach as high as about thirty percent at maximum loads. It should be noted that graph 1400 may only show the average packet loss ratios for the excess distribution scheme for graph clarity, but the limited scheme may have similar trends and results.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a receiver configured to receive a plurality of transmission requests from a plurality of end nodes via an optical network and an electrical network;
   a processor coupled to the receiver and configured to dynamically allocate optical transmission time slots to the end nodes according to measured round trip times (RTTs) of the end nodes, wherein the processor is configured to dynamically allocate the optical transmission time slots to the end nodes according to the measured RTTs of the end nodes by:
      sorting the end nodes in an increasing order based on the end nodes' RTTs; and
      allocating the optical transmission time slots to the end nodes in the sorted order; and
   a transmitter coupled to the processor and configured to transmit the allocated transmission time slots to the end nodes.

2. The apparatus of claim 1, wherein the processor is configured to dynamically allocate the optical transmission time slots further by:
   collecting statuses of transmission queues in a scheduling cycle; and
   allocating the optical transmission time slots to the end nodes according to the statuses.

3. The apparatus of claim 2, wherein the transmission queue statuses are downstream transmission queue statuses, upstream transmission queue statuses carried in the transmission requests, or combinations thereof.

4. The apparatus of claim 2, wherein one or more transmission queue statuses belong to each end node, wherein the processor is configured to dynamically allocate the optical transmission time slots by performing intra-end nodes scheduling, and wherein performing intra-end nodes scheduling comprises:

sorting the transmission queue statuses by the end nodes; and allocating the optical transmission time slots contiguously for the transmission queues belonging to the same end node.

5. The apparatus of claim 4, wherein the processor is configured to dynamically allocate the optical transmission time slots further by:

grouping the transmission queue statuses according to classes of service (CoS); and allocating a minimum bandwidth guaranteed to each CoS.

6. The apparatus of claim 5, wherein the processor is further configured to:

compute excess bandwidths in each CoS;

accumulate the excess bandwidths in each CoS into a surplus bandwidth; and distribute the surplus bandwidth among the end nodes that require more than the minimum bandwidth guaranteed to the CoS.

7. The apparatus of claim 4, wherein the processor is further configured to group the transmission queue statuses according to Logical Link Identifiers (LLIDs).

8. The apparatus of claim 4, wherein the transmission queues are associated with delivery priorities based on quality of service (QoS), and wherein the processor is further configured to schedule the optical transmission time slots for the transmission queues belonging to the same end node in a decreasing order of delivery priorities.

9. The apparatus of claim 1, wherein the processor is configured to dynamically allocate the optical transmission time slots by allocating contiguous optical transmission time slots to electrical network nodes that are coupled to a common media converter node via the electrical network.

10. The apparatus of claim 1, wherein the optical network comprises a passive optical network (PON), wherein the apparatus is an optical line terminal (OLT), and wherein the end nodes comprise optical network units (ONUs).

11. A method performed by an optical line terminal (OLT) comprising:

receiving a plurality of transmission requests from a plurality of network units via a passive optical network (PON) and an electrical network; and allocating optical transmission time slots to the network units dynamically according to measured round trip times (RTTs) of the network units, wherein allocating the optical transmission time slots to the network units dynamically according to the measured RTTs of the network units comprises:

sorting the transmission requests by the network units;

sorting the transmission requests for each network unit by class of service (CoS); and allocating the optical transmission time slots contiguously for the transmission requests from the same network unit.

12. The method of claim 11, wherein allocating the optical transmission time slots to the network units dynamically according to the measured RTTs of the network units comprises:

sorting the transmission requests by electrical network units that are coupled to a common media converter unit via the electrical network; and allocating the optical transmission time slots contiguously for the transmission requests from the electrical network units that are coupled to a common media converter unit.

\* \* \* \* \*